United States Patent
Calamari et al.

(10) Patent No.: US 6,260,647 B1
(45) Date of Patent: Jul. 17, 2001

(54) ELECTRONIC ENGINE SPEED CONTROLLER

(75) Inventors: Michael A. Calamari, Raleigh, NC (US); Paul D. Fuller, Leicester; Bhikhubhai S. Mistry, Whetstone, both of (GB); Dante T. Thomas, Raleigh, NC (US); J. Roger Watson, Newbold Verdon (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/385,816

(22) Filed: Aug. 30, 1999

(51) Int. Cl.$^7$ .................................................. B60K 41/00
(52) U.S. Cl. ........................ 180/179; 180/242; 180/308; 123/350; 701/93
(58) Field of Search ................... 701/93, 95; 180/305, 180/308, 170, 178, 179, 242; 123/349, 350

(56) References Cited

U.S. PATENT DOCUMENTS

| | | | |
|---|---|---|---|
| 2,612,965 | 10/1952 | Christie | 180/82.1 |
| 4,157,124 | 6/1979 | Poore | 180/105 |
| 4,286,685 | 9/1981 | Rudolph et al. | 180/176 |
| 4,396,087 | * 8/1983 | Rock et al. | 180/308 |
| 4,401,075 | 8/1983 | O'Keefe, Jr. et al. | 123/352 |
| 4,408,293 | 10/1983 | Avins | 364/426 |
| 4,419,729 | 12/1983 | Krieder | 364/426 |
| 4,453,519 | 6/1984 | Richards, Sr. | 123/378 |
| 4,541,052 | 9/1985 | McCulloch | 364/431.07 |
| 4,553,626 | 11/1985 | Kazmierczak et al. | |
| 4,747,326 | 5/1988 | Braun | 74/866 |
| 5,121,723 | 6/1992 | Stepper et al. | 123/322 |
| 5,519,259 | * 5/1996 | Voigt | 180/179 |
| 5,749,063 | 5/1998 | Sakonijy et al. | 701/93 |
| 5,873,427 | * 2/1999 | Ferguson et al. | 180/308 |
| 6,104,976 | * 8/2000 | Nakamura | 701/95 |

FOREIGN PATENT DOCUMENTS 2 337 137 A   11/1999   (GB) .

\* cited by examiner

*Primary Examiner*—Michael Mar
(74) *Attorney, Agent, or Firm*—Diana L. Charlton

(57) ABSTRACT

An electronic engine speed control system is used on a work machine utilizing an engine with a governor control movable between a plurality of positions. The governor control is operated by an operator so that a desired engine speed may be selected for driving a plurality of wheels through a transmission. The transmission is specifically controlled to obtain a desired ground speed independent of the selected engine speed. The engine speed control system includes an electronic control module. An operator switch is connected to the control module and is movable to a set position which sends an input signal with a desired engine speed value corresponding to a selected engine speed to the control module. An engine sensor is connectable between the engine and the control module for sensing the speed of the engine and sending an input signal with an actual engine speed value to the control module. An actuator is connected between the control module and the governor control and responsive to a control signal from the control module for moving the governor control to any one of the plurality of positions. The control signal is delivered to the actuator as a function of the desired and actual values so that the engine speed is electronically set and maintained at the selected engine speed.

5 Claims, 4 Drawing Sheets

ELECTRONIC ENGINE SPEED CONTROLLER

TECHNICAL FIELD

This invention relates generally to electronically controlling engine speed for a work machine and more particularly to the ability to electronically set and maintain the engine speed independent from the ground speed of the work machine so that various implements may be operated without continuous operator control of the engine speed.

BACKGROUND ART

Present work machines, such as wheel loaders, may utilize a hydrostatic transmission to assist in controlling ground speed. Typically, a plurality of variable displacement motors that drive the wheels of the work machine are displaced by a pressure signal within a signal line that is generated from a fixed displacement pump linked directly with an engine. Therefore, the ground speed is engine speed dependent so that as the engine speed increases the signal pressure increases to further displace the motor, increasing the ground speed. However, a "ball valve" is located in the signal line that can be opened to bleed off a volume of hydraulic fluid from the signal line to a tank, which subsequently reduces the signal pressure controlling the motor, slowing or even stopping the machine. Generally, this is referred to as the neutralization of the hydrostatic transmission so that the ground speed of the work machine is controlled substantially independent of the engine speed, allowing for increased power availability to the implement. However, during neutralization of the hydrostatic transmission, it is important to reach an engine speed that is high enough to operate an implement and maintain that engine speed throughout various loading conditions. Generally, this requires that an operator must continuously monitor and compensate for changes in the engine speed during operation of the implement, such as through the manual control of a governor pedal.

An approach for simultaneously controlling ground and engine speeds is disclosed in U.S. Pat. No. 4,157,124 issued to Bernard B. Poore on Jun. 5, 1979. This patent utilizes a vehicular gas turbine engine power system with an engine, an automatic clutch, a service clutch and an infinitely variable transmission coupled along a power train. A control system is utilized to control and vary the engine speed for maximum fuel efficiency in response to operator selected ground and engine speed commands. The engine speed is controlled substantially through exhaust gas temperature and engine speed feedback, reducing the ground speed, if necessary, to obtain the desired engine speed. The control system disclosed utilizes an advanced system for engine and ground speed control that functions with an infinitely variable transmission. The use of the disclosed control system would not be feasible on a work machine utilizing a hydrostatic transmission because of the need to control the engine speed independently from the ground speed. Preferably, the ability to control the engine speed independently from the ground speed control would utilize a separate electronic engine speed controller. Therefore, the engine could be set at any desired speed independent of the ground speed to efficiently drive a hydraulic implement pump for operating the implement and maintain the desired speed substantially throughout the implement operation. This ability would ensure efficient use of the engine, increase operator flexibility and control, and minimize operator fatigue. The engine speed controller should be relatively simple and inexpensive so that it may be easily added to an existing work machine already utilizing the hydrostatic transmission for controlling ground speed.

The present invention is directed to overcoming the problems as set forth above.

DISCLOSURE OF THE INVENTION

In one aspect of the present invention, an electronic engine speed control system is disclosed for a work machine. The work machine has an engine with a governor control that is movable between a plurality of positions so that a desired engine speed may be selected and utilized for driving a plurality of wheels through a hydrostatic transmission. The hydrostatic transmission is capable of controlling the plurality of wheels to obtain a desired ground speed of the work machine independent of the selected engine speed. The electronic engine speed control system comprises an electronic control module. An operator switch is connected to the control module and is movable to a set position which sends an input signal with a desired engine speed value to the control module. An engine sensor is connectable between the engine and the control module for sensing the speed of the engine and sending an input signal with an actual engine speed value to the control module. An actuator is connectable between the control module and the governor control and responsive to a control signal from the control module for moving the governor control to any one of the plurality of positions. The control signal is delivered to the actuator as a function of the desired and actual values so that the engine speed is electronically set and maintained at the desired value. Means are used for disrupting the control signal so that the engine speed is no longer electronically set and maintained at the desired value.

In another aspect of the present invention, a work machine comprises an engine, a plurality of wheels, a source of hydraulic fluid, a hydrostatic transmission, and an electronic engine speed control system. The hydrostatic transmission includes a hydraulic pump connected with the engine, a motor, a pressure signal line connected between the pump and the motor for transferring hydraulic fluid at various flows therebetween so that the motor drives the plurality of wheels at various speeds responsive to the flow of the hydraulic fluid, and a valve disposed within the signal line and movable from a closed position to a plurality of open positions for selectively neutralizing the hydraulic fluid flow to control the ground speed of the work machine independent from the engine speed. The electronic engine speed control system is operatively associated with and located remotely from the hydrostatic transmission for setting and maintaining the engine at any desired speed during neutralization of the hydrostatic transmission.

In yet another aspect of the present invention, an electronic engine speed control system is disclosed for a work machine. The work machine utilizes an engine with a governor control movable between a plurality of positions so that a desired engine speed may be selected and utilized for driving a plurality of wheels through a transmission. The transmission is controllable to obtain a desired ground speed independent of the selected engine speed. The electronic engine speed control system comprises an electronic control module. An operator switch is connected to the control module and is movable to a set position which sends an input signal with a desired engine speed value to the control module. An engine sensor is connectable between the engine and the control module for sensing the speed of the engine and sending an input signal with an actual engine speed value to the control module. An actuator is connectable between the control module and the governor control and responsive to a control signal from the control module for moving the governor control to any one of the plurality of positions. The control signal is delivered to the actuator as a function of the desired and actual values so that the engine speed is electronically set and maintained at the desired value. Means are used for disrupting the input signal between the operator switch and the control module so that the engine speed is no longer electronically set and maintained at the desired value.

In yet another aspect of the present invention, a method of setting and maintaining an engine speed for a work machine independent from the ground speed of the work machine is disclosed. The method comprises the steps of providing an engine with a governor control movable to a plurality of positions for controlling the engine speed. Then, selecting the engine speed by moving the governor control to one of the plurality of positions. Next, providing a transmission connected with the engine for driving a plurality of wheels at a desired ground speed corresponding to the engine speed. Then, selecting the ground speed independent from the engine speed by specifically controlling the transmission. Finally, electronically setting and maintaining the engine at a desired speed during the specific control of the transmission.

The present invention has the ability to set and maintain a desired engine speed independently from the ground speed of the work machine for increased implement operating capability. This ability eliminates the need for continuous and direct operation of a governor control pedal by an operator so that operator flexibility and control are enhanced and operator fatigue is reduced.

BEST MODE FOR CARRYING OUT THE INVENTION

Figure 1:
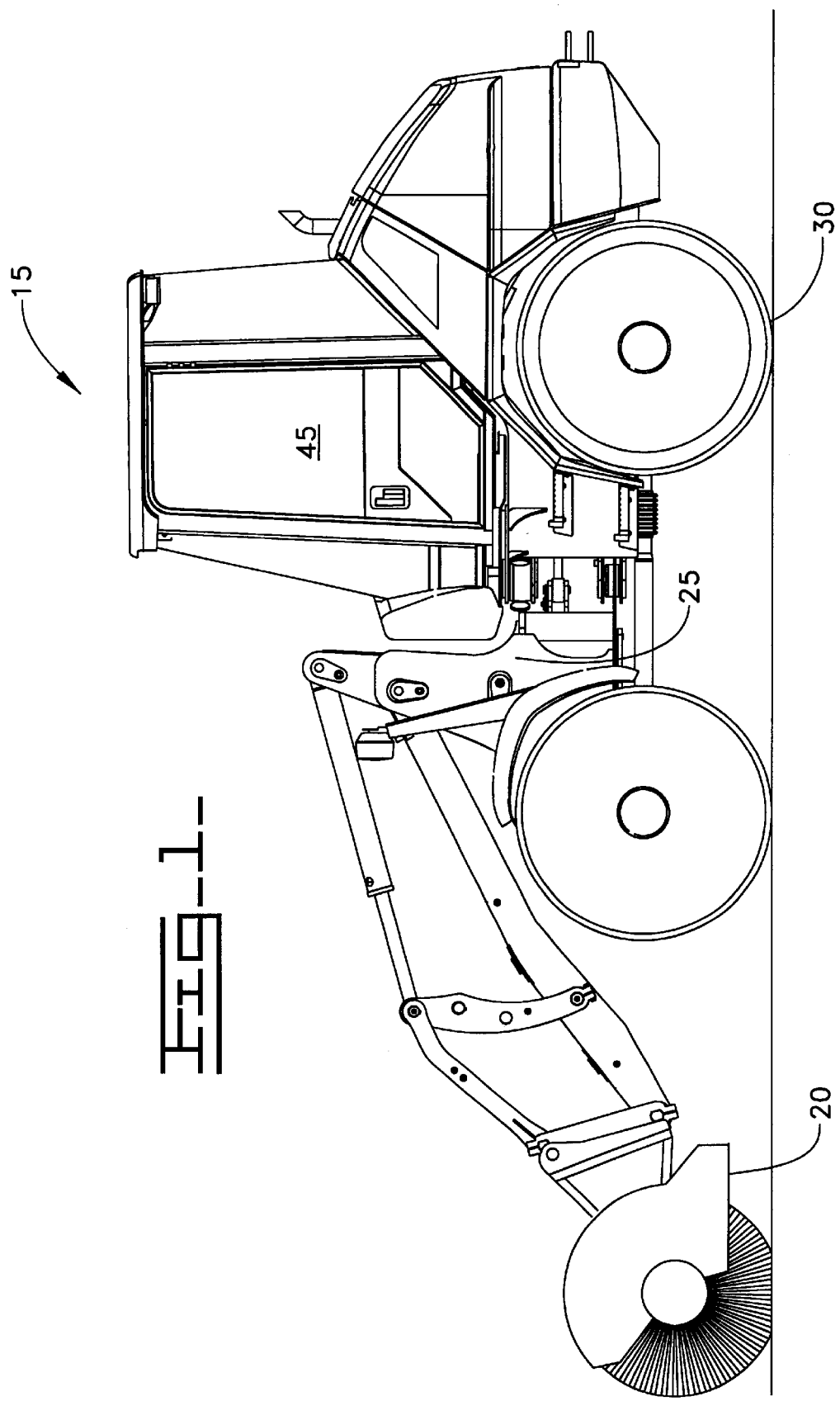
FIG. 1 is a diagrammatic side view of a work machine embodying the present invention.
Figure 2:
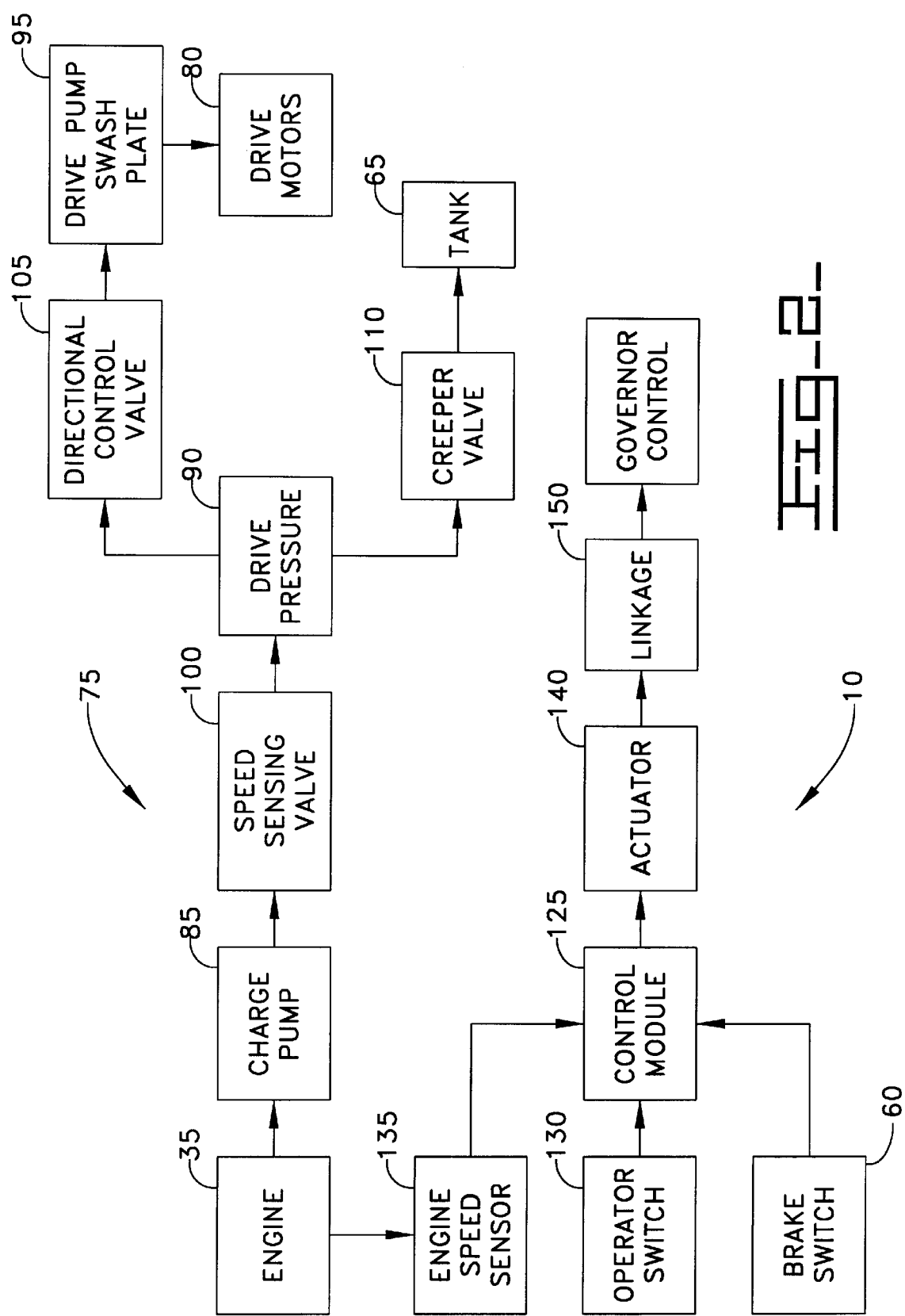
FIG. 2 is a schematic embodying the present invention in association with a hydrostatic transmission.
Figure 3:
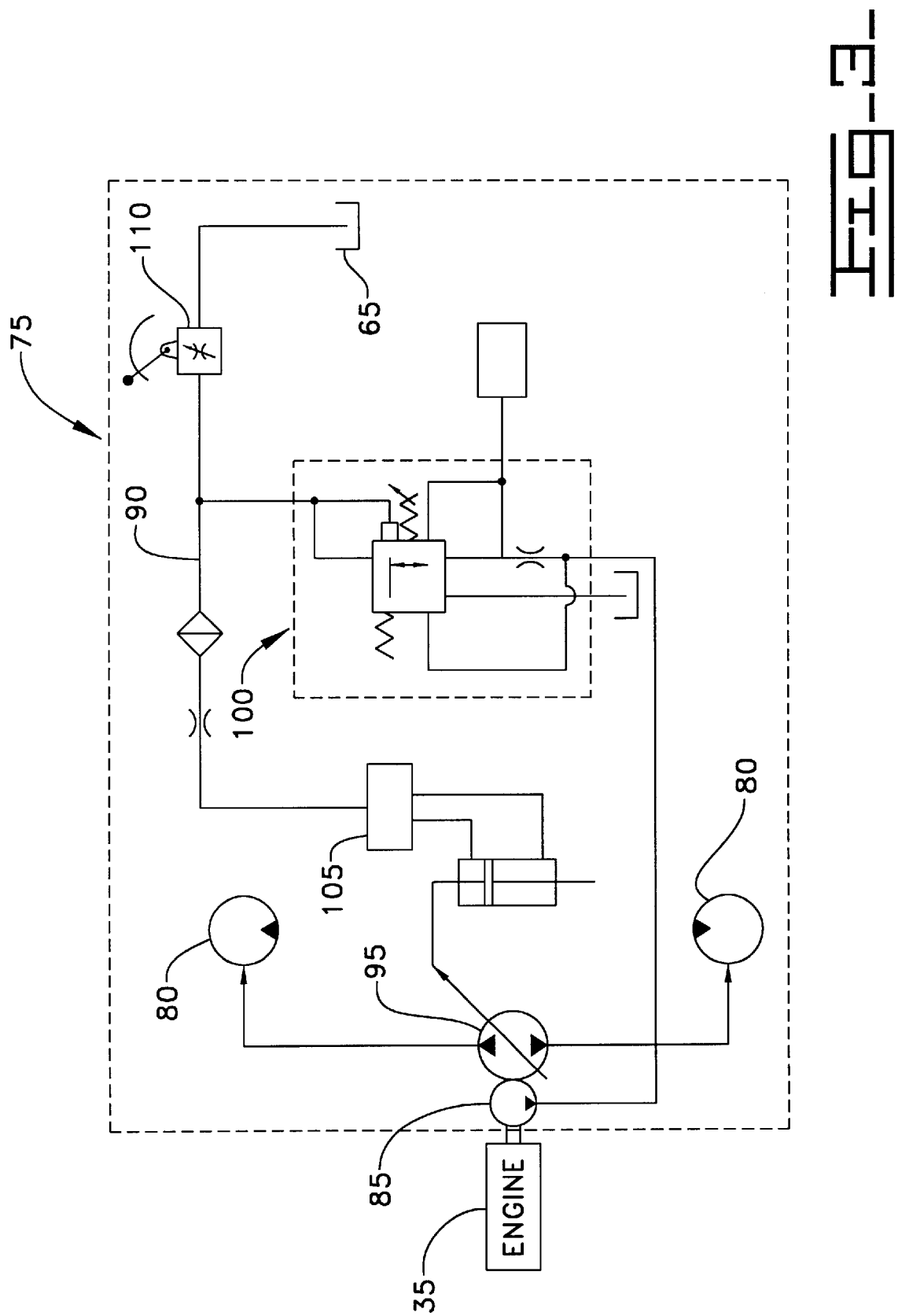
FIG. 3 is a hydraulic schematic representing the hydrostatic transmission, the hydrostatic transmission being shown separately from the present invention.
Figure 4:
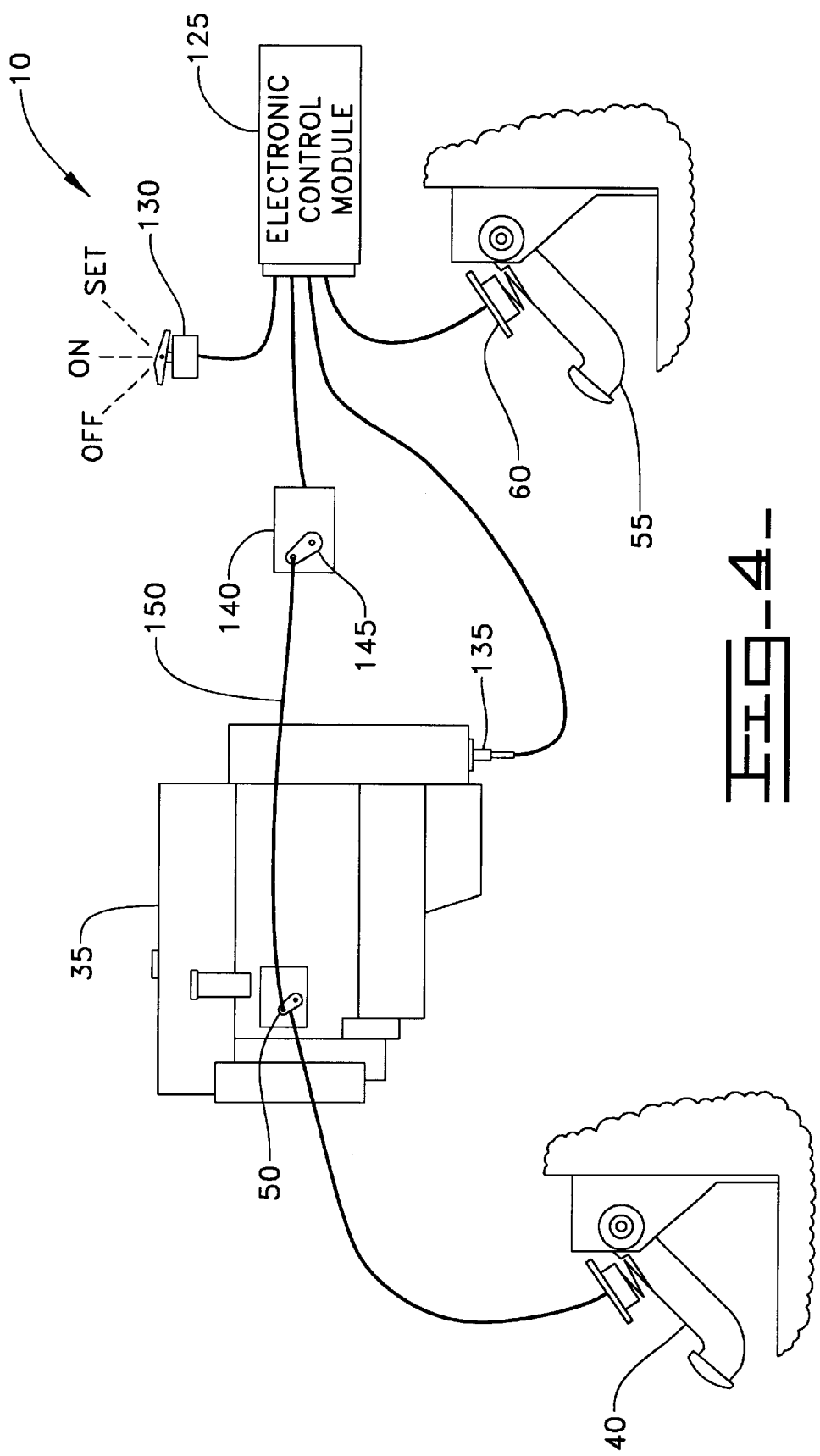
FIG. 4 is a pictorial schematic representing the present invention, the present invention being shown separately from the hydrostatic transmission.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to the drawings, it can be seen that a electronic engine speed control system 10 is schematically illustrated for setting and maintaining the engine speed of a work machine 15, such as a wheel loader/integrated tool carrier, independent from the ground speed to increase the power availability to control an implement 20, such as a rotary broom. The work machine 15, shown in FIG. 1, includes a frame 25 for supporting a plurality of wheels 30. An engine 35 is connected to the frame 25 of the work machine 15 in a well-known manner. A governor control pedal 40 is connected to the frame 25 and located within an interior portion 45 of the work machine 15 in a well-known manner for connection with a governor control 50 on the engine 35. The governor control 50 can be moved to a plurality of positions to control the speed of the engine 35. A brake control pedal 55 is connected to the frame 25 and located within the interior portion 45 of the work machine 15 in a well-known manner for connection with the plurality of wheels 30. The brake control pedal 55 is movable between an operating and non-operating position. A brake switch 60 is disposed within the brake control pedal 55 for sensing the operating position of the brake control pedal 55. A hydraulic reservoir tank 65 is connected in a well-known manner to the frame 25 to supply a source of hydraulic fluid for operating the work machine 15.

A hydrostatic transmission 75 is operatively associated with the engine 35 for driving the plurality of wheels 30 in either a forward or reverse direction through a drive motor 80. The hydrostatic transmission 75 includes a hydraulic charge pump 85 connected to the engine 35 in a well-known manner. A drive pressure signal line 90 hydraulically connects the charge pump 85 to the drive motor 80 through a drive pump 95. A speed sensing valve 100, movable between a closed position and a plurality of open positions, is connected to the charge pump 85 and disposed within the signal line 90. A directional control valve 105 is disposed within the signal line 90 and connected between the speed sensing valve 100 and the drive pump 95. The control valve 105 is movable between an open and closed position for controlling hydraulic flow to the drive pump 95 to direct the drive motor 80 in either the forward or reverse direction. A creeper valve 110 is disposed within the signal line 90 and connected between the drive pump 95 and the tank 65. The creeper valve 110 is movable from a closed position to a plurality of open positions.

The electronic engine speed control system 10 is operatively associated with and located from the hydrostatic transmission 75. The engine speed control system 10 includes an electronic control module 125 of a well-known design. An operator switch 130 is connected on the frame 25 and located in the interior portion 45 of the work machine 15. The operator switch 130 is a conventional three-position switch movable between on, off, and set positions. The operator switch 130 is connected to the control module 125. An engine sensor 135 is connected between the engine 35 and the control module 125. An electronic actuator 140 is connected between the governor control 50 and the control module 125. An actuator arm 145 of the actuator 140 is connected via a mechanical linkage 150 to the governor control 50.

Industrial Applicability

Initially, the governor control pedal 40 is manually moved by an operator (not shown) to a desired position for selecting the speed of the engine 35. The speed of the engine 35 runs the charge pump 85 which provides a source for the signal pressure within the signal line 90. Signal pressure will vary with engine speed and is directed via the control valve 105 to control hydraulic fluid from the drive pump 95. The drive pump 95 controls the drive motor 80 for moving the plurality of wheels 30 of the work machine 15 at a ground speed dependent on the selected speed of the engine 35. At this time, however, the operator (not shown) may desire to operate the implement 20 which may require greater engine speed than that selected. In order to increase the engine speed without changing the ground speed, the operator (not shown) utilizes the creeper valve 110 to select a desired ground speed. Upon selection, the creeper valve 110 opens and a predetermined portion of the pressure within the signal line 90 is directed to the tank 65. The open position of the creeper valve 110 reduces or neutralizes the flow of hydraulic fluid to the control valve 105, and, hence, the drive motor 80, to reduce the ground speed of the work machine 15 accordingly. Therefore, the operator (not shown) may continue to manually move the governor control pedal 40 to select the desired engine speed, independently from the ground speed of the work machine 15, to effectively operate the implement 20. This function is normally referred to as the neutralization of the hydrostatic transmission 75 and is a well-known transmission design feature.

The operator (not shown) may prefer to set and maintain the engine speed without continuous manual operation of the governor control pedal 40 during the neutralization of the hydrostatic transmission 75. This methodology may be accomplished with the electronic engine speed control system 10. It should be understood that although a hydrostatic transmission 75 is shown and described for association with the electronic engine speed control system 10, any transmission that allows the ground speed of the work machine 15 to be established independently from the engine speed may fall within the spirit and scope of the present invention. It should also be understood that the electronic engine speed control system 10 may be initially included on the work machine 15 with the hydrostatic transmission 75 or later incorporated into an existing work machine 15 already utilizing the hydrostatic transmission 75.

First, the operator (not shown) moves the operator switch 130 to the on position. When the desired engine speed is reached through manual operation of the governor control pedal 40, the operator (not shown) then moves the operator switch 130 to the set position. The set position of the operator switch 130 sends an input signal with a desired engine speed value corresponding to the instantaneous engine speed produced by the position of the governor control pedal 40 to the control module 125. Simultaneously, the engine speed sensor 135 senses the engine speed and sends an input signal with an actual engine speed value to the control module 125. The control module 125 receives the input signals from the operator switch 130 and the engine speed sensor 135 for translation and outputs a control signal as a function of the desire and actual engine speed values. The actuator 140 receives the control signal for translation and, responsively, moves the actuator arm 145 to a corresponding position. The position of the actuator arm 145 applies a force to the linkage 150 and moves the governor control 50 to one of the plurality of positions. The function of the control module 125 is to correct any differences between the desired and actual engine speed values so that the governor control 50 maintains the desired engine speed set by the operator (not shown) throughout operation of the implement 20. It should be understood that it is desirable for the control module 125 design to translate the desired and actual engine speed values into a control signal that allows the engine speed to incrementally increase over a set period of time. This feature of the control module 125 enhances control aspects of the electronic engine speed control system 10. The utilization of the electronic engine speed control system 10 for setting and maintaining the engine speed independently from the ground speed eliminates the necessity of the operator (not shown) to manually operate the governor control pedal 40. Therefore, operator flexibility and control are enhanced while operator fatigue is reduced.

When the operator (not shown) no longer desires to have the engine speed set and maintained through the electronic engine speed control system 10, a means is used for disrupting the control signal. This can be accomplished by the operator (not shown) moving the operator switch 130 to the off position, thereby, eliminating the input signal to the control module 125. Additionally, the operator (not shown) may move the brake control pedal 55 to the operating position so that the brake switch 60 will send an input signal to the control module 125 for disrupting the control signal. These features allow for a simple and convenient method of disrupting the control signal and reinstating manual operation of the governor control pedal 40 to the operator (not shown).

Other aspects, objects and advantages of this invention can be obtained from a study of the drawings, disclosure and the appended claims.

What is claimed is:

1. An electronic engine speed control system for a work machine utilizing an engine with a governor control movable between a plurality of positions corresponding to a plurality of engine speeds so that a desired engine speed may be selected and utilized for driving a plurality of wheels through a hydrostatic transmission drive system which includes a hydraulic pump and a hydraulic motor, the hydrostatic transmission drive system includes a control valve disposed between the hydraulic pump and the hydraulic motor for controlling the plurality of wheels to obtain a desired ground speed of the work machine independent of the selected engine speed; comprising:

an electronic control module;

an operator switch connected to the control module and movable to a set position which sends an input signal with a desired engine speed value to the control module;

an engine sensor connectable between the engine and the control module for sensing the speed of the engine and sending an input signal with an actual engine speed value to the control module;

an actuator connectable between the control module and the governor control and responsive to a control signal from the control module for moving the governor control to any one of the plurality of positions, the control signal being delivered to the actuator as a function of the desired and actual engine speed values so that the engine speed is electronically set and maintained at the desired engine speed value; and means for disrupting the control signal so that the engine speed is no longer electronically set and maintained at the desired value.

2. The electronic engine speed control system of claim 1, wherein the means for disrupting the control signal includes disrupting the input signal between the operator switch and the control module.

3. The electronic engine speed control system of claim 1, includes a brake pedal operable with the plurality of wheels of the work machine and having a brake switch located therein in connection with the control module, wherein the means for disrupting the control signal includes the brake switch sending a disrupt signal to the control module.

4. The electronic engine speed control system of claim 1, wherein the engine speed is electronically set by the control module to the desired value through incremental increases in the engine speed over a predetermined period of time.

5. The electronic engine speed control system of claim 1, wherein the actuator includes an actuator arm and a mechanical link is connectable between the actuator arm and the governor control, the actuator being responsive to the control signal to move the actuator arm to a predefined position so that in cooperation with the mechanical link the governor control is moved to any one of the plurality of positions.

* * * * *